July 21, 1964  J. ZUIJDENDORP  3,142,014
CONTROL-DEVICE FOR USE IN RESISTANCE WELDING SYSTEMS
Filed Dec. 22, 1960

INVENTOR
JOHANNES ZUIJDENDORP
BY
AGENT

3,142,014
CONTROL-DEVICE FOR USE IN RESISTANCE WELDING SYSTEMS
Johannes Zuijdendorp, Eindhoven, Netherlands, assignor to North American Philips Company, Inc., New York, N.Y., a corporation of Delaware
Filed Dec. 22, 1960, Ser. No. 77,575
Claims priority, application Netherlands Jan. 27, 1960
4 Claims. (Cl. 323—25)

This invention relates to a control-device for use in a resistance welding system in which inverted-parallel-connected, gas or vapour-filled main discharge tubes which supply the welding transformer are controlled by pulses from two gas or vapour-filled auxiliary discharge tubes. The auxiliary discharge tubes are also controlled by pulses which are superimposed on a varying direct voltage which determines the welding time.

It is known that one or more intermediate stages may furthermore be provided between the auxiliary discharge tubes and the main discharge tubes.

When using special welding transformers, particularly those in which so-called directional sheet iron is used for the core, troublesome phenomena may occur if there is no remanent magnetism in the core of the transformer, i.e. during the first half wave with which the primary winding of the transformer is supplied by the first main discharge tube. This results in a very high initial pulse, so that the transformer may assume an inadmissibly high temperature if the apparatus is switched on for comparatively short intervals, particularly in seam welding. Moreover, the main discharge tube concerned may be damaged by the high current intensity.

In accordance with the invention, this disadvantage can be obviated by additionally supplying to the control-circuit of the auxiliary discharge tube controlling the first main discharge tube that becomes operative, pulses which lag in time with respect to the first-mentioned control-pulses for the said auxiliary discharge tube. At the beginning of the welding period only the first of the last-mentioned control-pulses is attenuated via a third auxiliary discharge tube, so that only the lagging pulses can ignite the auxiliary discharge tube concerned.

The time lag will, in general, amount to 90° or more so that an excessive increase in current intensity across the primary winding of the transformer is avoided.

Figure 1:
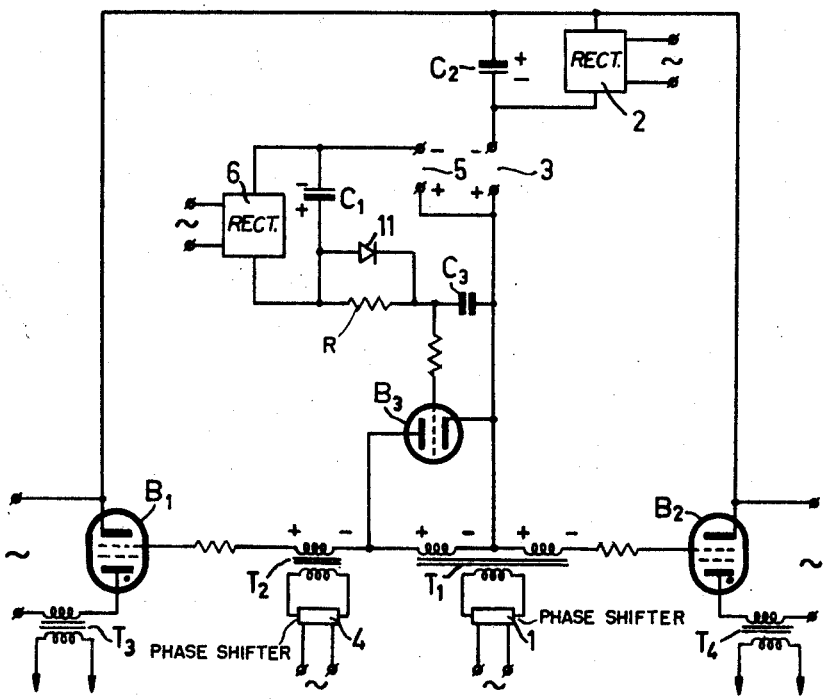
Figure 2:
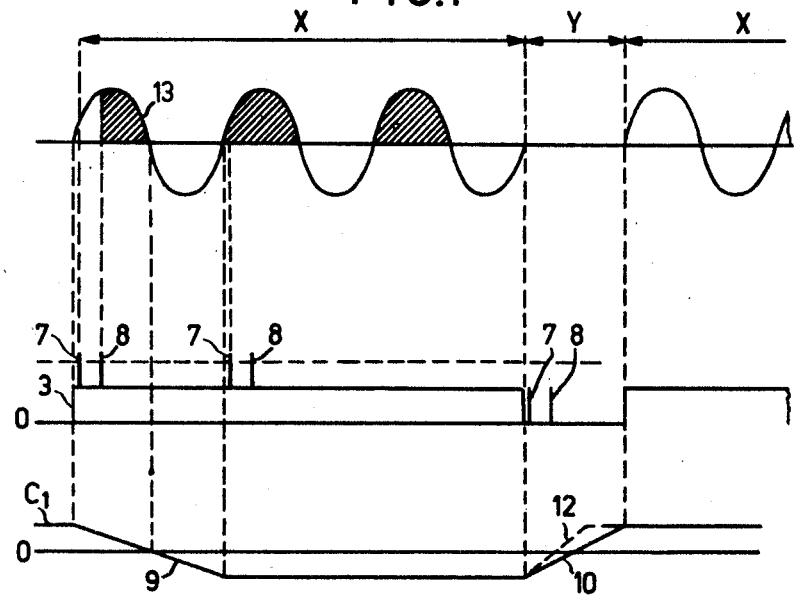

The invention will now be described more fully by way of example with reference to the accompanying drawing in which:

FIG. 1 schematically illustrates a control-device according to the invention and FIG. 2 is a timing diagram further illustrating the operation thereof.

As shown in FIG. 1, the auxiliary gas-filled discharge tubes $B_1$ and $B_2$ supply via the output transformers $T_3$ and $T_4$ across the anode circuits the ignition voltages for the thyratrons or ignitrons, not shown, which supply in turn the primary winding of the welding transformer (not shown).

The ignition voltage for the tubes $B_1$ and $B_2$ is obtained from the saturated transformer $T_1$, which supplies pulsatory voltages and which is supplied from a phase-shifting bridge 1, by means of which the instant of ignition of the main tubes can be controlled. The negative bias voltage for the tubes $B_1$ and $B_2$ is obtained from a capacitor $C_2$, which is supplied by a rectifier 2. Capacitor $C_2$ is connected in series with a variable direct voltage 3, for example, a source of square-wave voltage. This square-wave voltage 3 is positive with respect to the grids of the tubes $B_1$ and $B_2$ during the welding interval ($x$ periods) and may, for example, be equal to zero for the intervening rest intervals ($y$ periods), so that the pulses from $T_1$ are capable of igniting the tubes $B_1$ and $B_2$ for the welding interval, whereas the valves $B_1$ and $B_2$ are cut off for the intervening rest intervals.

It is assumed that $B_1$ brings about the ignition during the first, the third, etc. half periods and $B_2$ during the second, the fourth, etc. half periods of the welding current.

The control-circuit of the tube $B_1$ includes in series with the secondary ignition voltage of the transformer $T_1$ the secondary winding of an equally saturated transformer $T_2$, which is supplied from a phase-shifting bridge 4 so that the secondary pulsatory voltages lag in time with respect to the pulsatory voltages across the secondary windings of the transformer $T_1$.

In parallel with the secondary winding of the transformer $T_1$, in the control-circuit of the tube $B_1$, there is connected a third auxiliary tube $B_3$. Tube $B_3$ is controlled so that the first pulsatory voltage is short-circuited at the beginning of a welding period. The tube $B_3$ is preferably a high-vacuum tube, since this kind of tube can be conductive at a lower voltage, for example, lower than 20 volts.

The operation is as follows:

A second square-wave voltage 5, of which the positive leading edge coincides in time with the positive leading edge of the square-wave voltage 3, is operative in series with a positive bias voltage obtained from the capacitor $C_1$ and an RC circuit comprising a resistor R and a capacitor $C_3$ in the control-circuit of the tube $B_3$. The capacitor $C_1$ is supplied with the bias voltage via a rectifier 6. The positive voltage 5 exceeds the voltage of $C_1$ and the two voltages are operative with opposite polarities in the circuit.

As soon as the square-wave voltage 3 occurs, the discharge tube $B_1$ could ignite owing to the positive pulsatory voltage across the left-hand secondary winding of the transformer $T_1$. However, this is prevented by the auxiliary tube $B_3$, which short-circuits this voltage, since it is conductive at the instant concerned owing to the positive bias voltage across the capacitor $C_1$. The positive square-wave voltage 5 which exceeds, as stated above, the voltage at the capacitor $C_1$, dominates only after a given time lag owing to the RC time constant of the resistor R and capacitor $C_3$. This time lag is chosen so that the auxiliary tube $B_3$ is cut off within half a period and, in certain cases, within a whole period owing to the predominating negative voltage of square wave voltage 5.

The tube $B_1$ is therefore not ignited by the lagging pulse until the instant at which an inadmissible high current pulse across the primary winding of the welding transformer is avoided. At the subsequent ignitions of the tubes $B_2$ and $B_1$ during the normal welding operation, the instance of these ignitions are determined by the voltage pulses from the secondary windings of the transformer $T_1$, since the tube $B_3$ is held in cut-off to the end of the welding period by the positive square-wave voltage 5, which charges capacitor $C_3$ so that the grid of tube $B_3$ is negative relative to the cathode. During successive half periods of a welding interval, remanent magnetism prevails in the core of the welding transformer so that the aforesaid disadvantage does not occur.

The operation of the arrangement shown in FIG. 1 will now be described with reference to FIG. 2.

The square-wave voltage 3, varying between zero volts and a positive value, is also designated by 3 in FIG. 2. Superimposed upon square wave voltage 3 are the pulsatory voltages 7 from the left-hand secondary winding of the transformer $T_1$ and pulses from the secondary winding of the transformer $T_2$, which are lagging in time and are designated by 8. The positive bias voltage of the capacitor $C_1$ is also designated by $C_1$ before the beginning of the welding time $x$. At the instant when the positive square-wave voltage 3 occurs, the square-wave voltage 5 also becomes positive, but owing to the time constant of the $RC_3$ circuit, it has no effect in tube $B_3$ until after, for example, half a period of the alternating voltage 13, which is indicated by the line 9. At the instant when the first pulse 7 occurs, the tube $B_3$ has therefore a positive bias voltage, so that this pulse is attenuated across it. The tube $B_1$ will thus be ignited by the pulse 8 at an instant which has a time lag of about 90° with respect to the beginning of the positive half wave 13. At the occurrence of the second pulse 7 the tube $B_3$ is cut-off, so that a normal ignition of the tube $B_1$ can take place, which is illustrated in the topmost figure by the diagonal shade lines. The second pulse 8 no longer exerts any influence. At the end of the welding time $x$ the positive square-wave voltage 5 again becomes zero, so that the positive bias voltage of the capacitor $C_1$ again becomes operative, although with a certain time lag owing to the time constant of the $RC_3$ circuit. This is indicated in FIG. 2 by the line 10.

In order to insure that with a short rest interval $y$ of, for example, one period, the auxiliary tube $B_3$ is again sufficiently conductive before the end of the interval, it is advisable to shunt the resistor R by a rectifier 11 in FIG. 1, so that the grid voltage of the tube $B_3$ becomes positive with a considerably shorter time lag, which is indicated in FIG. 2 by the broken line 12.

The time lag of the pulses 8 with respect to the pulses 7 is adjustable. This time difference may be reduced at a later ignition by means of the pulses 7, but the pulses 8 will always lag in time, which may be ensured by a coupling between the phase-shifting bridges 1 and 4.

In the description above it is assumed that by known measures the first auxiliary tube $B_1$ is always ignited first. If, for some reason, this measure is considered to be undesirable, a second secondary winding of the transformer $T_2$ may, for example, be connected between the right-hand secondary winding of $T_1$ and the grid of the tube $B_2$. This latter winding will also supply lagging pulses to the grid of tube $B_2$. A second tube $B_3$, controlled from the same circuit, may then be connected in parallel with the right-hand secondary winding of $T_1$ to short-circuit the ignition pulses 7, so that it is then unimportant whether the tube $B_1$ or the tube $B_2$ ignites first.

In this case both of the auxiliary tubes $B_3$ must be blocked substantially within half a period of the alternating voltage in order to cause the second tube to ignite by means of the pulse 7.

What is claimed is:

1. Electrical apparatus for use in a resistance welding system, comprising means for producing a signal for initiating the operation of said system, input means for a control signal having a duration equal to the desired welding interval, means for producing subsequent to the start of said control signals recurring first pulse signal, means for producing a second pulse signal at an instant subsequent to the occurrence of the initial said first pulse signal and during the duration of the control signal, means for attenuating the initial first pulse occurring during a given welding interval, said means comprising pulse attenuating means connected to said first pulse producing means and means for actuating said attenuating means in synchronism with the occurrence of said control signal during the initial portion thereof, and means for applying said control signal and said first and second pulses to said initiating signal producing means to recurrently actuate said welding system in synchronism with the occurrence of said second pulse signal and subsequently occurring said first pulse signals applied to said producing means during the occurrence of said control signal.

2. Electrical apparatus for use in a resistance welding system, comprising an electron discharge device for producing a signal for initiating the operation of said system, input means for a first control signal having a duration equal to the desired welding interval, means for producing subsequent to the start of said control signal recurring first pulse signals, means for producing a second pulse signal at an instant subsequent to the occurrence of the initial said first pulse signal and during the duration of the control signal, a second electron discharge device connected to said first pulse producing means for attenuating the initial first pulse occurring during a given welding interval, input means for a second control signal, means for applying said second control signal to said second electron discharge device thereby to actuate the same in synchronism with the occurrence of said first control signal and during the initial portion thereof, and means for applying said first control signal and said first and second pulses to said first electron discharge device thereby to recurrently actuate said welding system in synchronism with the occurrence of said second pulse signal and subsequently occurring said first pulse signals applied to said first electron discharging device during the occurrence of said first control signal.

3. Electrical apparatus for use in a resistance welding system operating with an alternating current of given frequency, comprising an electron discharge device for producing a signal for initiating the operation of said system, input means for a first control signal at D.C. potential having a duration equal to the desired welding interval, means for producing subsequent to the start of said first control signal first pulse signals recurring at said given frequency during the duration of said first control signal, means for producing second pulse signals recurring at said given frequency at an instant subsequent to the occurrence of said first pulse signal and during the duration of the first control signal, a second electron discharge device connected to said first pulse producing means for attenuating the initial first pulse occurring during a given welding interval, input means for a second control signal at D.C. potential and initiated at the start of said first control signal, means for delaying the second control signal, means for applying said delayed second control signal to said second electron discharge device thereby to actuate the same in synchronism with the occurrence of said first control signal and during the initial portion thereof, and means for applying said first control signal and said recurring first and second pulses to said first electron discharge device thereby to recurrently actuate said welding system in synchronism with the occurrence of the initial said second pulse signal and subsequently occurring said first pulse signals applied to said first electron discharge device during the occurrence of said first control signal.

4. Electrical apparatus for use in a resistance welding system, comprising first and second gaseous discharge tubes alternately actuated to produce respectively first and second signals for initiating the operation of said system, input means for a first control signal at D.C. potential having a duration equal to the desired welding interval, input means for an alternating current of given frequency, means for applying the alternating current to said first and second tubes in phase opposition thereby to alternately energize the same, a first pulse network and a phase shifter for producing subsequent to the start of said first control signal first pulse signals recurring at said given frequency during the duration of said first control signal, a second pulse network and a second phase shifter for producing second pulse signals recurring at said given frequency at an instant subsequent to the occurrence of said first pulse signal and during the duration of the first control signal, an electron tube connected to said first pulse network for attenuating the initial first pulse occurring during a given welding interval, input means for a second control signal at D.C. potential and initiated at the start of said first control signal, means for delaying the second control signal, means for applying the delayed second control signal to said electron tube thereby to actuate the same in synchronism with the occurrence of said first control signal and during the initial portion thereof, and means for applying said first control signal and said recurring first and second pulses to at least one of said gaseous discharge tubes thereby to recurrently actuate said welding system in synchronism with the occurrence of the initial said second pulse signal and subsequently occurring said first pulse signals applied to said one of the said gaseous discharge tubes during the occurrence of said first control signal.

References Cited in the file of this patent

UNITED STATES PATENTS 2,341,562   Klemperer _____ Feb. 15, 1944